United States Patent
Barbosa de Oliveira Ferreira Salles et al.

(10) Patent No.: US 10,024,358 B2
(45) Date of Patent: Jul. 17, 2018

(54) CRANK-DRIVE WITH BEARINGS HAVING MICRO-RAMP STRUCTURES OF ASYMMETRIC FORM

(71) Applicant: THYSSENKRUPP METALURGICA CAMPO LIMPO LTDA., Campo Limpo Paulista (BR)

(72) Inventors: Bruno Barbosa de Oliveira Ferreira Salles, Campinas (BR); Ricardo Santoro Cardoso, Limeira (BR); Durval Duarte, Jundiai (BR)

(73) Assignee: THYSSENKRUPP METALURGICA CAMPO LIMPO LTDA., Campo Limpo Paulista, SP (BR)

( * ) Notice: Subject to any disclaimer, the term of this patent is extended or adjusted under 35 U.S.C. 154(b) by 0 days.

(21) Appl. No.: 14/413,213

(22) PCT Filed: Jul. 2, 2013

(86) PCT No.: PCT/IB2013/001421
§ 371 (c)(1),
(2) Date: Jan. 6, 2015

(87) PCT Pub. No.: WO2014/006481
PCT Pub. Date: Jan. 9, 2014

(65) Prior Publication Data
US 2015/0204377 A1    Jul. 23, 2015

(30) Foreign Application Priority Data

Jul. 6, 2012 (EP) ..................................... 12175369

(51) Int. Cl.
F02B 75/32 (2006.01)
F16C 9/02 (2006.01)
(Continued)

(52) U.S. Cl.
CPC ................... *F16C 9/02* (2013.01); *F16C 9/04* (2013.01); *F16C 17/028* (2013.01); *F16C 2240/44* (2013.01)

(58) Field of Classification Search
USPC ........................................ 123/197.4; 384/457
See application file for complete search history.

(56) References Cited

U.S. PATENT DOCUMENTS

| 4,747,705 A | 5/1988 | Agrawal |
| 5,725,314 A | 3/1998 | Fannar |
| 7,270,482 B2 | 9/2007 | Nanbu et al. |

FOREIGN PATENT DOCUMENTS

JP   2008095721 A   *   4/2008

OTHER PUBLICATIONS

Machine Translation of JP2008095721A PDF File Name: "JP2008095721A_Machine_Translation.pdf".*

(Continued)

*Primary Examiner* — Lindsay Low
*Assistant Examiner* — Ruben Picon-Feliciano
(74) *Attorney, Agent, or Firm* — thyssenkrupp North America, Inc.

(57) ABSTRACT

The present invention relates to a crank-drive with a crank-shaft, at least one connecting rod and at least one piston, in particular a crank-drive of an internal combustion engine, whereas the crank-shaft features at least one radial bearing (13) for supporting the crank-shaft in a crank-housing, at least one radial bearing for connecting the connecting rod to the crank-shaft, and the connection of the connecting rod to the piston features at least one radial bearing and whereas the bearings feature a bearing inner surface and/or a bearing outer surface. According to the invention in at least one of the bearing surfaces are arranged micro-ramp structures with an asymmetric form having a first concave section between the bearing surface and a bottom point of the micro-ramp (Continued)

structure and a second concave section between the bottom point and the bearing surface, whereas between the micro-ramp structures are arranged sections of the bearing surface.

8 Claims, 3 Drawing Sheets

(51) Int. Cl.
*F16C 9/04* (2006.01)
*F16C 17/02* (2006.01)

(56) References Cited

OTHER PUBLICATIONS

International Search Report for International patent application No. PCT/IB2013/001421; dated Dec. 4, 2013.
Written Opinion of the International Search Authority for International patent application No. PCT/IB2013/001421; dated Dec. 4, 2013.
English translation of abstract of JP 2008095721 (A).

* cited by examiner

CRANK-DRIVE WITH BEARINGS HAVING MICRO-RAMP STRUCTURES OF ASYMMETRIC FORM

CROSS REFERENCE TO RELATED APPLICATIONS

This application is a U.S. National Stage Entry of International Patent Application Serial Number PCT/IB2013/001421, filed Jul. 2, 2013, which claims priority to European patent application no. 12175369.3, filed Jul. 6, 2012.

FIELD

The present invention relates to a crank-drive with a crank-shaft, at least one connecting rod and at least one piston, in particular a crank-drive of an internal combustion engine, whereas the crank-shaft features at least one radial bearing for supporting the crank-shaft in a crank-housing, at least one radial bearing for connecting the connecting rod to the crank-shaft, and the connection of the connecting rod to the piston features at least one radial bearing and whereas the bearings feature a bearing inner surface and/or a bearing outer surface. Moreover the present invention is directed to a crank-shaft of a crank-drive, a radial bearing for such a crank-drive and a radial bearing itself.

BACKGROUND

In the last few decades a lot of research has been done in the field of plain bearings in general. Most of the investigations have been done in the field called "micro grooves" or "micro ramps" in at least one of the surfaces of the radial bearing partners. It consists of inserting micro geometrical modifications in the hydrodynamic bearing surface in order to improve its performance under actual operating conditions. But in the special field of radial bearings for crank-drives, which are operated under difficult operational conditions due to continuously changing load directions and load conditions, a deeper research in improving the radial plain bearings has not been performed.

Document U.S. Pat. No. 5,725,314 A refers to a hydrodynamic bearing including a cylindrical body having an inner wall and an outer wall, a plurality of gutters along the inner wall and a number of wedge-shaped recesses in fluid receiving communication with the gutters. Thus, the wedge-shaped recesses and the gutters form a number of micro grooves in one of the bearing surfaces. The wedge-shaped recesses has a wide portion along the circumference of the inner wall but none of the disclosed embodiments feature micro structures in the inner or outer bearing surface, which are only partly applied in the bearing surface, and the shown gutters and microgrooves lead to a decrease of maximal mechanical load.

Document U.S. Pat. No. 4,747,705 A discloses another hydrodynamic bearing having a plurality of pads on the inner bearing surface forming ramp shaped peaks. The bearing is optimized for high speed turbo machines which require special journal bearings to support their high speed rotating parts. Hydrodynamic bearings operate under the principle of hydrodynamic generation, wherein pressure is generated in the clearance between the bearing surface and the rotating part, such pressure producing a net load capacity and film stiffness. The hydrodynamic bearing herein disclosed is performed for special high speed applications and do not allow low rotating speeds and are optimized for about 40.000 rpm. Thus, a bearing having ramps in the bearing surface as herein disclosed are not applicable for crank-drive and in particular for supporting a crank-shaft in a crank-housing, because the bearing is not performed to provide a sufficient mechanical load.

SUMMARY

Thus, the invention has the objective to provide a radial bearing with an improved load behavior which can be applied for a crank-drive and in particular for a crank-shaft.

BRIEF DESCRIPTION OF THE DRAWINGS

The present disclosure is described in detail below with reference to the attached drawing figures, wherein.

DETAILED DESCRIPTION

Figure 1:
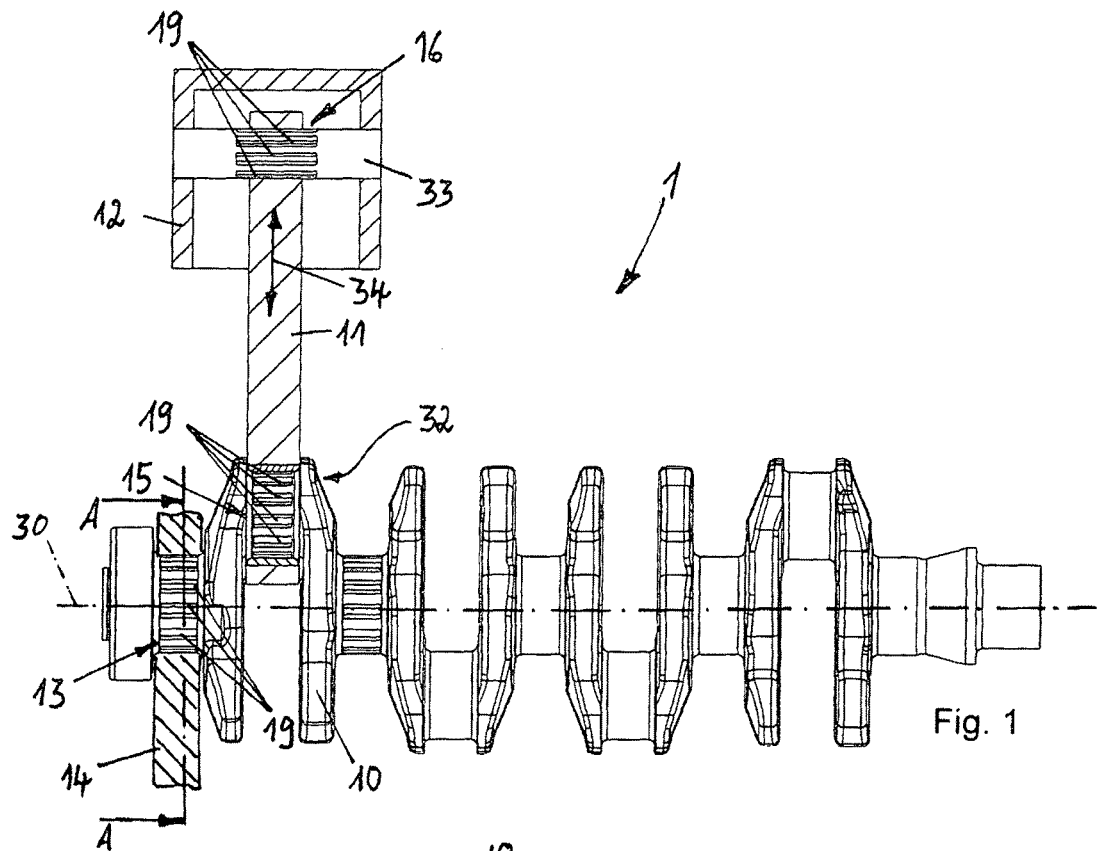
FIG. 1 is a side, partial cross-section view of an embodiment of a crank-drive of the present disclosure having a crank-shaft, a connecting rod, and a piston.

The invention discloses that in at least one of the bearing surfaces are arranged micro-ramp structures with an asymmetric form having a first concave section between the bearing surface and a bottom point of the micro-ramp structure and a second concave section between the bottom point and the bearing surface, whereas between the micro-ramp structures are arranged sections of the bearing surface.

Simulations and tests with different types of micro-ramp structures in crank-drives showed that the improvements in the operational parameters of the hydrodynamic radial bearings were extremely high when featuring micro-ramp structures according to the present invention. All bearing operating parameters, namely a lowered maximum oil film pressure, a maximized minimum oil film thickness, a maximized axial oil flow rate and a minimized power loss due to friction were improved by the inclusion of micro-ramp structures in a radial hydrodynamic bearing inner or outer surface featuring a design as described above. Therefore, this is a quite clear indication that the inclusion of these micro-ramp structures on a hydrodynamic radial bearing sliding surface will indeed significantly improve its performance.

Moreover, considering the extremely high improvements shown by simulation results, real tests show that the inclusion of properly designed asymmetric micro-ramp structures having a first concave section between the bearing surface and a bottom point of the micro-ramp structure and a second concave section between the bottom point and the bearing surface with sections of the basic bearing surface in between lead to extremely well suited bearings in crank-drives. Such bearings can be applied to support a crank-shaft in a crank-housing or as a crank-journal for connection a connecting rod to the crank-shaft or e.g. between a connecting rod and a piston pin.

The main reason for improving the bearing parameters is a positive impact on the so called wedge effect. The improved load carrying capacity of a hydrodynamic radial bearing having micro-ramp structures as disclosed above is mainly based on a wedge mechanism in the convergent zone between the bearing journal and the bearing housing due to the eccentric position of the journal in the housing. Due to the invention between each of the micro-ramp structures are arranged zones of conventional basic bearing surfaces and according to the invention each of the micro-ramps form a single wedge zone in front of the following basic bearing surface with no cavity. Thus, the oil pressure in the gap between the inner bearing partner and the outer bearing partner increases in the micro-ramp zone and is kept up in the basic bearing surface or, respectively, does at least not feature a significant deviation.

As a result a bearing with a number of micro-ramps in front of zones of conventional basic bearing surfaces the bearing obtains an extremely high load capacity and is thus well suited to be applied in a crank-drive, because in a crank-drive high and peak-like loads in continuously changing directions stress the bearings in the crank-drive, but a bearing with a design according to the invention is able to withstand said peak loads in an excellent way.

According to the invention in at least one bearing surface, i.e. in the bearing inner surface and/or in the bearing outer surface, are arranged micro-ramp structures with an asymmetric design. The asymmetric design bases on different shapes of the first concave section and the second concave section. The asymmetry is formed related to the rotating direction of the opposite bearing partner. The concave shape of the sections describe a shape according to a quadrant of a circle or at least a deformed circle or of an ellipse and the first concave section features a different length compared to the second concave section, whereas the bottom point describes the lowermost point or line, respectively, in the micro-ramp structure. This point or line forms the transition from the first into the second concave section. In general, the design of non-symmetric regions forming the micro-ramps could be geometrically or mathematically defined as concavity shapes, sets of straight lines, polynomial functions or splines, among others, and combinations thereof.

For another improvement the length of the first concave section is smaller than the length of the second concave section, but in particular both sections are present and thus greater than zero. The length is measured relating to the rotating direction of the bearing partner. When the length of the first concave section is smaller than the length of the second concave section, the bottom point is arranged closer to the beginning of the micro-ramp with regard to the rotating direction. Consequently the first concave section leads to a diverging zone until the bottom point is reached and the subsequent second concave section leads to a converging zone beginning from the bottom point to the end of the micro-ramp into the basic surface of the bearing. The second concave section forms the wedge-ramp, whereas wedge-effect is inherent to the radial bearing geometry. Thus, the wedge-effect is increased by the use of a long second concave section. In the present invention, the use of micro-ramps allows that, in comparison with a bearing without micro-ramps, for the same oil film thickness, there is an increasing in load carrying capacity or, for a specific load carrying capacity, the minimum oil film thickness is increased.

Additionally, it occurs a peak reduction on the hydrodynamic pressure and a reduction on the engine power loss when the crank-drive with the inventive bearings is in use, regarded to the reduction of the fluid friction due to the smaller hydrodynamic resistance regarded and to the smaller fluid shear stress.

The wedge-effect on the micro-ramp is described by the fluid passage inside the micro-ramp. In each micro-ramp, there is a gradual reduction of volume between the second concave section and the subsequent bearing surface. The gradual reduction of volume occurs between the maximum depth of the micro-ramp and the main or basic diameter of the journal and/or the housing. The fluid is restricted to flow from the second concave section to the subsequent bearing surface, dragging a constant quantity of fluid from a bigger to a smaller volume region, increasing the fluid pressure inside the micro-ramp.

In the region formed by the subsequent bearing surface is generated a hydrodynamic stabilization, reducing the Reynolds number and conditioning the fluid for the entrance in the next micro-ramp.

According to another embodiment of the inventive micro-ramp structure the bottom point features a depth below the bearing surface with an amount which is at least 50 times, preferably 100 times, more preferably 200 times and most preferred about 500 to 1000 times smaller than the total length of the first and second concave sections. This aspect ratio between the total length of the entire micro-ramp and the depth of the micro-ramp leads to a very flat shape of the structure, and in the groove formed by the micro-ramp a huge aggregation of lubricant is avoided and bubbles in the lubricant do not appear.

According to yet another embodiment between the bearing partners is provided a radial clearance, whereas the depth of the micro-ramp structure amounts 1% to 50% and preferred 2.5% to 20% of the clearance. An advantageous amount of the depth of the micro-ramp the structure can be about 1 µm to 8 µm and preferred 4 µm, in particular when the clearance amounts about 40 µm. This means that the depth of the micro-ramp structure can be about 5% to 20% and preferred 10% of the clearance value.

Yet another improvement embodied in the present invention is formed by a bearing surface between the micro-ramp structures which feature a length which is 20% smaller or larger and preferably 10% smaller or larger than the total length of the first and second concave sections or which most preferred features the same total length of the first and second concave sections. The total length of the first and second concave sections amounts about 1 mm to 7 mm, preferably 2 mm to 5 mm and most preferred 2.7 mm, e.g. when the diameter of the inner or outer bearing partner features a diameter of about 69 mm. Thus, the length of the intermediate bearing surfaces also amounts about 2 mm and 5 mm and preferred 2.7 mm.

According to yet another improvement of the present invention the radial bearing features an axial length perpendicular to the rotating direction, whereas the micro-ramp structure features an axial width which is smaller than the axial length of the radial bearing. The axial length is measured with the contact length of the bearing partners in axial direction. Accordingly the micro-ramp structure does not extend across the entire axial length of the bearing, and beside the micro-ramp structure the bearing surface is continuously formed over the entire circumference. This leads to the positive effect that lubricant, which is received in the micro-ramp structure, cannot leakage sideways in axial direction and the maximum pressure of the lubricant within the micro-ramp structure remains at high values. Advantageously the oblong extension of the micro-ramp structure is formed perpendicular to the rotation direction and thus the micro-ramp structure extends in axial direction of the bearing, e.g. parallel or coaxial with the shaft axis.

The present invention is also directed to a crank-shaft for a crank-drive, in particular for a crank-drive of an internal combustion engine, whereas the crank-shaft features an inner bearing partner of at least one radial bearing for supporting the crank-shaft in a crank-housing, an inner bearing partner of at least one radial bearing for connection a connecting rod to the crank-shaft, whereas the inner bearing partners feature a bearing outer surface. According to the invention in the bearing outer surface are arranged micro-ramp structures with an asymmetric form having a first concave section between the bearing outer surface and a bottom point of the micro-ramp structure and a second concave section between the bottom point and the bearing outer surface, whereas between the micro-ramp structures are arranged sections of the bearing outer surface. The aforementioned features and advantages which are disclosed in conjunction with the crank-drive are herewith also incorporated in the disclosure of the crank-shaft.

Furthermore, the present invention is also directed to a radial bearing for a crank-drive or for a crank-shaft, at least one connecting rod and/or at least one piston, in particular for a crank-drive of an internal combustion engine, whereas the bearing forms at least one radial bearing for supporting the crank-shaft in a crank-housing, and/or forms at least one radial bearing for connecting the connecting rod to the crank-shaft and/or forms at least one radial bearing for connecting of the connecting rod to the piston, and whereas the bearing features a bearing inner surface and/or a bearing outer surface. According to the invention, in at least one of the bearing surfaces are arranged micro-ramp structures with an asymmetric form having a first concave section between the bearing surface and a bottom point of the micro-ramp structure and a second concave section between the bottom point and the bearing surface, whereas between the micro-ramp structures are arranged sections of the bearing surface. The aforementioned features and advantages which are disclosed in conjunction with the crank-drive are herewith also incorporated in the disclosure of the bearing itself.

The aforementioned components as well as the claimed components and the components to be used in accordance with the invention in the described embodiments are not subject to any special exceptions with respect to their size, shape, material selection and technical concept such that the selection criteria known in the pertinent field can be applied without limitations.

PREFERRED EMBODIMENT OF THE INVENTION

Additional details, characteristics and advantages of the invention are disclosed in the subclaims. The figures and the following description show preferred embodiments in an exemplary fashion of the subject matter according to the invention in conjunction with the accompanying figures, in which FIG. 1 shows an embodiment of a crank-drive 1 with a crank-shaft 10, a connecting rod 11 and a piston 12, whereas the connecting rod 11 and the piston 12 are shown in a unique form in an exemplary fashion only, and the crank-drive 1 can comprise a number of a connecting rods 11 and pistons 12. The crank-shaft 10 can rotate in a shaft axis 30, and due to the protruding position of the crank-journal 32, in which the connecting rod 11 is connected to the crank-shaft 10, the piston 12 can perform a reciprocal moving up and down in a reciprocal moving direction 34.

The connecting rod 11 is connected to the crank-journal 32 by means of a radial bearing 15, and the piston 12 is connected to the connecting rod 11 with a radial bearing 16 by means of a piston pin 33. In order to support the crank-shaft 10 rotatable in the shaft axis 10 in a crank-housing 14, a number of radial bearings 13 are provided but the number of bearings are represented by only one shown bearing 13.

Each of the bearings 13, 15 and 16 feature a micro-ramp structure 19 on at least one bearing surface, which structure is described in the following figures in more detail.

Figure 2:
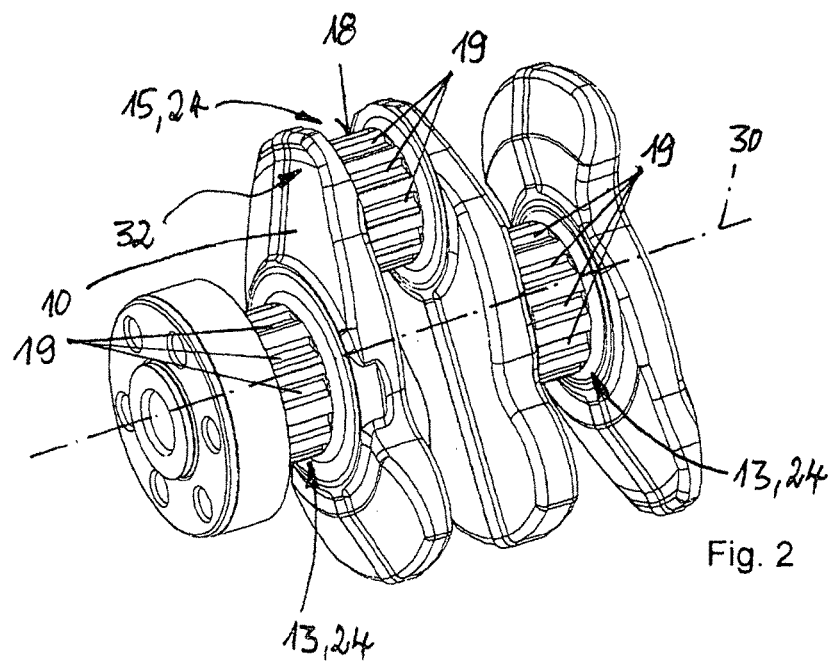
FIG. 2 is a perspective view of a section of an embodiment of a crank-drive of the present disclosure.

FIG. 2 shows a section of the crank-shaft 10 in a perspective view. Two of the radial bearings 13 are shown to support the crank-shaft 10 in the crank-housing 14, moreover a crank-journal 32 is shown in a protruding position with a distance to the shaft axis 30. Each of the bearings 13 and 15 feature a number of micro-ramp structures 19 in the bearing outer surface 18, whereas the opposite bearing partner is not shown.

Figure 3:
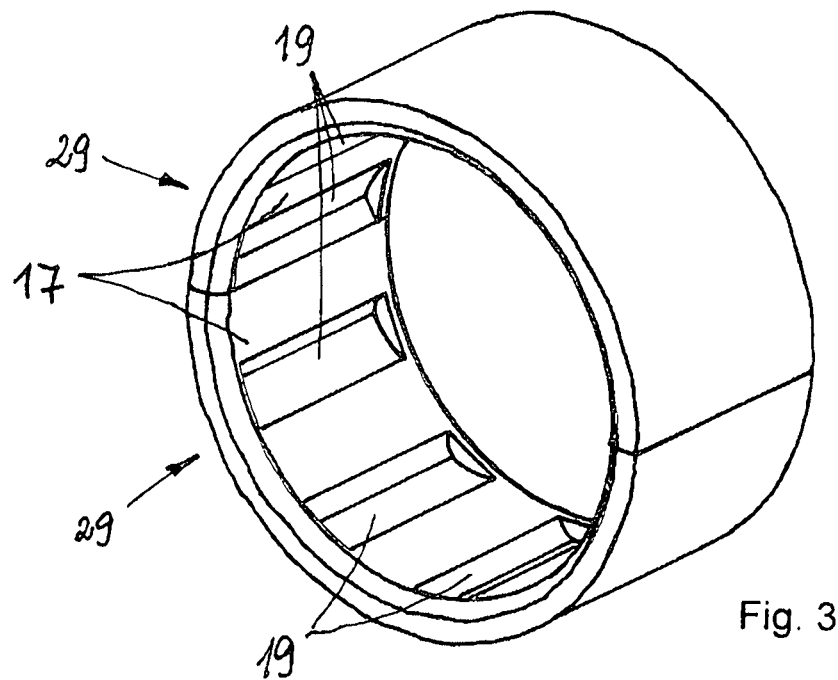
FIG. 3 is a perspective view of an embodiment of a bearing element forming a baring insert, as disclosed herein.

FIG. 3 shows a pair of bearing elements 29 forming bearing inserts, which can be applied e.g. between the crank-shaft 10 and the big end of the connecting rod 11 or between the crank-shaft and the crank-housing 14. In the bearing inner surface 17 a number of micro-ramp structures 19 are applied, and e.g. the opposite bearing partner can be represented by the radial bearing 13 or the radial bearing 15, whereas only one bearing surface may feature a micro-ramp structure 19.

Figure 4:
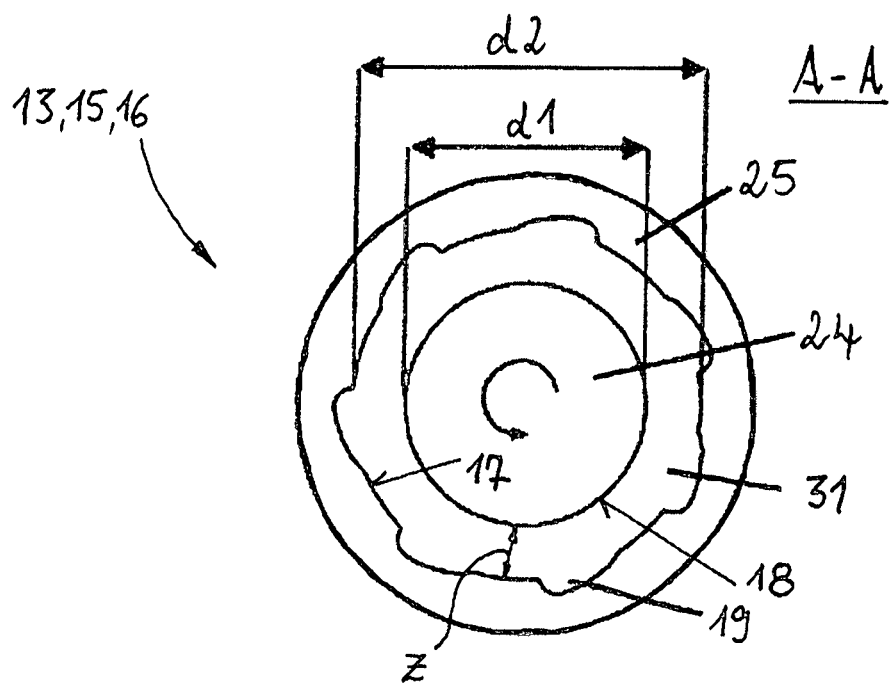
FIG. 4 is an end, cross-section view of an embodiment of a bearing of the present disclosure, having an inner and outer bearing partner.

FIG. 4 shows a cross-section along the section-line A-A as indicated in FIG. 1. The cross-section shows an inner bearing partner 24, e.g. forming the radial bearing 13 of the crank-shaft 10, and an outer bearing partner 25, e.g. forming the crank-housing 14.

The inner bearing partner 24 features an outer diameter d1 and the outer bearing partner 25 features an inner diameter d2, whereas the inner diameter d2 is greater than the outer diameter d1. Accordingly between the inner diameter d2 and the outer diameter d1 is formed a clearance z, whereas the clearance z forms the space which is filled with a lubricant, e.g. with oil.

Figure 5:
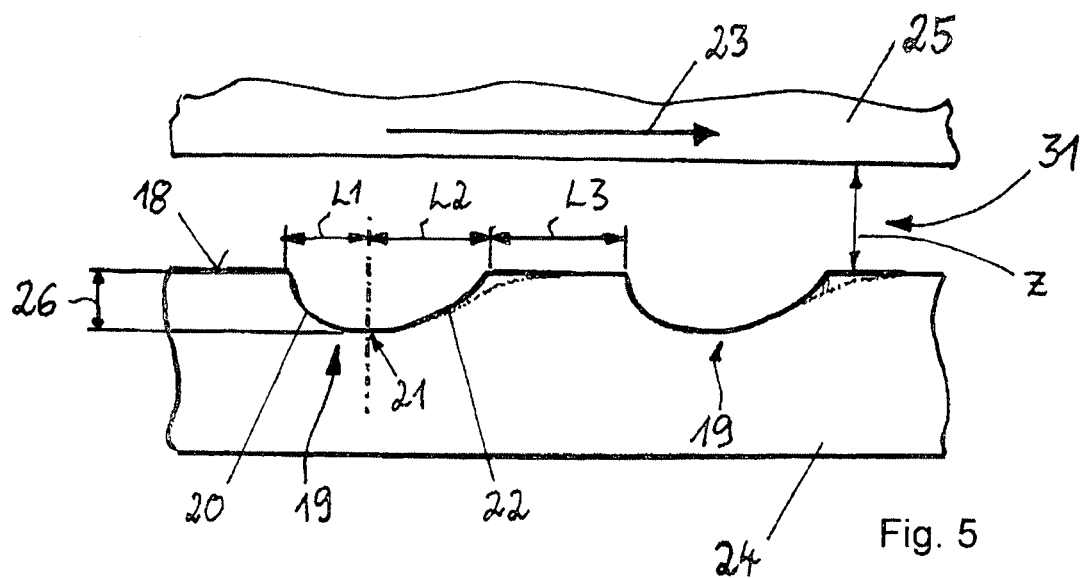
FIG. 5 is a detail view of an embodiment of a micro-ramp structure and an opposite bearing partner, as disclosed herein.
Figure 6:
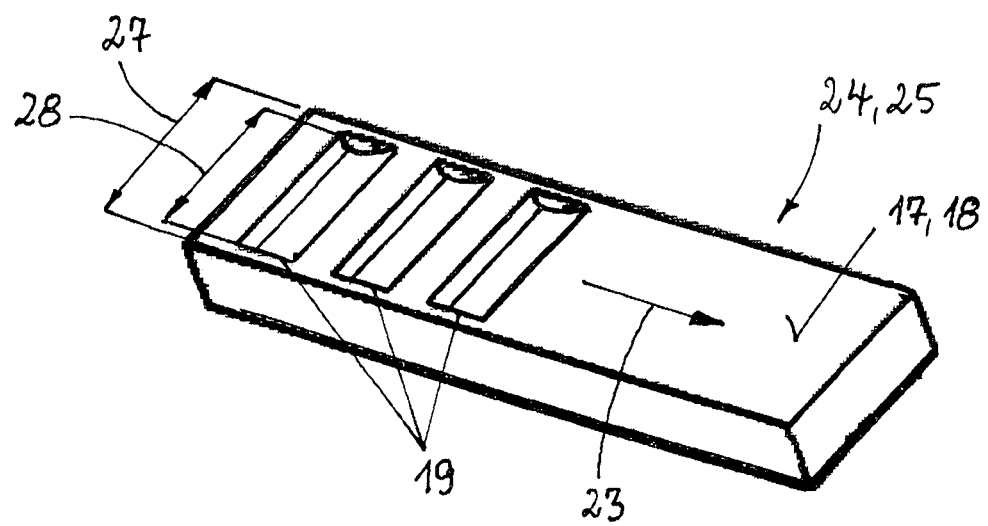
FIG. 6 is a perspective detail view of an embodiment of a micro-ramp structure in an uncoiled extended section of a bearing partner, as disclosed herein.

The bearing outer surface 18 of the inner bearing partner 24 forms a circular shape, whereas the bearing inner surface 17 of the outer bearing partner 25 features a number of micro-ramp structures 19, which are shown in FIG. 5 and FIG. 6 in more detail.

FIG. 5 shows an inner bearing partner 24 and an outer bearing partner 25 in a planned section view, and in the bearing outer surface 18 of the inner bearing partner 24 are applied micro-ramp structures 19. The opposite bearing partner 25 moves in a rotating direction 23 relative to the inner bearing partner 24. Between the bearing partners 24 and 25 is formed a lubrication gap 31 forming a clearance z. According to another embodiment the bearing partner featuring the micro-ramp structures 19 also can be formed by the outer bearing partner 25 as shown in FIG. 4.

The micro-ramp structure 19 in the bearing outer surface 18 features an asymmetric form relative to the rotating direction 23, and the micro-ramp structure 19 comprises a first concave section 20 between the bearing surface 18 and a bottom point 21 of the structure 19 and a second concave section 22 between the bottom point 21 and the bearing surface 18. Between the micro-ramp structures 19 are arranged sections of the bearing surface 18, having a length L3. The length of the first concave section 20 is indicated with L1 and the length of the second concave section 22 is indicated with L2.

The concave section 20 diverges from the bearing surface 18 down to the bottom point 21 and the second concave section 22 converges from the bottom point 21 up to the bearing surface 18 with respect to the clearance z. The concave sections 20 and 22 feature a shape according of a circle or an ellipse having a longitudinal extension in the rotating direction 23. The bottom point 21 forms the transition between the first concave shape 20 and the subsequent second concave shape 22. The length L1 of the first concave section 20 is smaller than the length L2 of the second concave section 22. The length L3 of the bearing surface 18 between to micro-ramp structures 19 is shown as being smaller than the total length L1+L2 of the micro-ramp structure 19, whereas in another preferred embodiment the equation L1+L2=L3 may be accomplished. The depth 26 of the micro-ramp structure 19 can feature an amount, which is at least 50 times, preferably 100 times and more preferably 200 times and most preferred about 500 to 1000 times smaller than the total length of the first and the second concave sections L1 and L2. Thus, the depiction does not show a true scale of the micro-ramp structure 19, which have in effect a very low depth 26.

FIG. 6 finally shows another embodiment of an inner bearing partner 24 or an outer bearing partner 25 having a bearing inner surface 17 or a bearing outer surface 18, developed on a plane surface for illustration. The rotating direction 23 of the other, opposite bearing partner is indicated by an arrow. The perspective view of the bearing partner 24 or 25 shows three micro-ramp structures 19 with an axial width 28, which is smaller than the axial length 27 of the bearing partner 24, 25. This leads to the positive effect that oil, which is received in the micro-ramp structures 19, cannot leakage sideways in axial direction and the maximum pressure of the oil within the micro-ramp structure 19 remains at high values.

The present invention is not limited to the embodiments described above, which are represented as examples only and can be modified in various ways within the scope of protection defined by the appending patent claims.

The invention claimed is:

1. A crank-drive for an internal combustion engine, comprising:
   a crank-shaft having at least a first and a second radial bearing, said first radial bearing configured to support said crank-shaft in a crank-shaft housing;
   at least one connecting rod coupled to said crank-shaft at said second radial bearing of said crank-shaft; and
   at least one piston coupled to said at least one connecting rod by at least a third radial bearing,
      wherein at least one of said first, second, and third bearing includes at least a first bearing surface, in which first bearing surface is defined a plurality of asymmetric concave micro-ramp structures spaced apart from one another by sections of said first bearing surface disposed there between, each of said micro-ramp structures having an axial width that extends substantially a full axial length of said at least one bearing such that each micro-ramp structure,
      defines a wedge zone for lubricant to be disposed therein, and
      is configured to cause the lubricant to generate a wedge effect in said wedge zone between said micro-ramp structure and a second bearing surface of a complementary opposing bearing partner during relative rotation between said first bearing surface and the second bearing surface, which wedge effect produces an increase in load carrying capacity between said first bearing surface and the second bearing surface, and
      wherein each concave asymmetric micro-ramp structure comprises a single groove defined in said first bearing surface and has
         a first concave section defined between the bearing surface and a bottom point of the concave micro-ramp structure, and
         a second concave section defined between the bottom point of the micro-ramp structure and the bearing surface, and
      wherein at least one of said micro-ramp structures has a depth, at the bottom point below the bearing surface, that is at least 50 times less than a total length of the first and second concave sections.

2. The crank-drive of claim 1, wherein a direction of rotation of a complementary opposing bearing partner about said at least one of said first, second, and third bearings with respect to said micro-ramp structures is from said first concave section to said second concave section, and wherein a length of said first concave section is less than a length of said second concave section.

3. The crank-drive of claim 2, wherein a clearance is defined between said at least one of said first, second, or third bearing and said complementary opposing bearing partner, and wherein said depth of said micro-ramp structures is between about 1% and about 50% of said clearance.

4. The crank-drive of claim 1, wherein said depth of said micro-ramp structures is between about to 1 μm to about 8 μm.

5. The crank-drive of claim 2, wherein a length of said sections of bearing surface separating adjacent micro-ramp structures is between about 20% larger and about 20% smaller than the combined total length of said first and second concave sections.

6. The crank-drive of claim 2, wherein a total combined length of said first and second concave sections is between about 1 mm to about 7 mm.

7. A crank-shaft for use in a crank-drive of an internal combustion engine, comprising:
   a crank-shaft having a plurality of radial bearings defined therein;
   an first inner bearing partner having an outer surface defined on at least a first radial bearing and configured to support said crank-shaft in a crank-housing;
   a second inner bearing partner having an outer surface defined on at least a second radial bearing and configured to be coupled to a connecting rod; and
   a plurality of asymmetric concave micro-ramp structures defined in said outer surfaces of at least one of said first and second bearing partners and spaced apart from one another by sections of said respective bearing outer surface disposed there between, each of said micro-ramp structures having an axial width that extends substantially a full axial length of said at least one bearing such that each micro-ramp structure,
      defines a wedge zone for lubricant to be disposed therein, and
      is configured to cause the lubricant to generate a wedge effect in said wedge zone between said micro-ramp structure and a second bearing surface of a complementary opposing bearing partner during relative rotation between said first bearing surface and the second bearing surface, which wedge effect produces an increase in load carrying capacity between said first bearing surface and the second bearing surface, wherein each concave asymmetric micro-ramp structure comprises a single groove defined in said first bearing surface and has a first concave section defined between the bearing surface and a bottom point of the concave micro-ramp structure, and a second concave section defined between the bottom point of the micro-ramp structure and the bearing surface, and wherein at least one of said micro-ramp structures has a depth, at the bottom point below the bearing surface, that is at least 50 times less than a total length of the first and second concave sections.

8. A radial bearing for a crank-drive of an internal combustion engine, comprising:

a radial bearing configured to permit radial motion between at least one of a coupled crank-shaft and crank-housing, crank-shaft and connecting rod, or connecting rod and piston;

at least a first bearing surface defined on said radial bearing; and a plurality of asymmetric concave micro-ramp structures defined in said first bearing surface and spaced apart from one another by sections of said first bearing surface disposed there between, each of said micro-ramp structures having an axial width that extends substantially a full axial length of said at least one bearing such that each micro-ramp structure, defines a wedge zone for lubricant to be disposed therein, and is configured to cause the lubricant to generate a wedge effect in said wedge zone between said micro-ramp structure and a second bearing surface of a complementary opposing bearing partner during relative rotation between said first bearing surface and the second bearing surface, which wedge effect produces an increase in load carrying capacity between said first bearing surface and the second bearing surface, wherein each concave asymmetric micro-ramp structure comprises a single groove defined in said first bearing surface and has a first concave section defined between the bearing surface and a bottom point of the concave micro-ramp structure, and a second concave section defined between the bottom point of the micro-ramp structure and the bearing surface, and wherein at least one of said micro-ramp structures has a depth, at the bottom point below the bearing surface, that is at least 50 times less than a total length of the first and second concave sections.

* * * * *